Patented Apr. 25, 1950

2,505,649

UNITED STATES PATENT OFFICE 2,505,649

PROCESS FOR PREPARING WATER-REPELLENT COMPOSITIONS

Josef Pikl, Glassboro, N. J., assignor to E. I. du Pont de Nemours & Company, Wilmington, Del., a corporation of Delaware No Drawing. Application July 30, 1947, Serial No. 764,913

4 Claims. (Cl. 260—67.6)

This invention relates to an improvement in the process for preparing water-repellent compositions which are more particularly reaction products of a methylol melamine and a fatty acid methylol amide and preferably further reacted with a tertiary amine.

The polymethylol melamines are usually prepared by the reaction of formaldehyde and melamine (2,4,6-triamino-s-triazine), and they may contain from 3 to 6 methylol groups per triazing ring, the methylol groups being substituted for the hydrogen of the amine radicals. Their preparation is described in published literature.

In U. S. Patent 2,357,273, textile material is finished with an agent comprising an aqueous dispersion of a methylated methylol melamine and methylol stearamide, and, after application of the material, the treated fiber is heated. While the use of acidic catalysts in this process is mentioned, the acids employed necessarily are weak acids or only very small amounts of strong acids, because the reaction is carried out on the textile fiber. The finish thus obtained, however, is not satisfactory as a water-repellent for textiles since it does not have the necessary water-repellent properties and the material does not show the required fastness to washings.

It is therefore an object of this invention to provide a process for producing reaction products of methylol melamine and methylol stearamide which either alone or when reacted with pyridine hydrochloride exhibit excellent initial water-repellency, good resistance to impact penetration and good fastness to washing when applied to fabrics by the usual wet baking procedure. A further object of the invention to provide a process for controlling the condensation of the methylol melamine, or a lower alkyl ether thereof, with a methylol acylamide, which condensation products possess unconsumed methylol radicals or methylol ether group whereby they can be further reacted with a tertiary amine, such as pyridine, to give products having good stability while also exhibiting the good water-repellent properties as specified above.

According to the present invention, a water-repellent composition which can be applied to textile fibers from suspensions, followed by a baking procedure, and which then thus applied gives excellent initial water-repellency, good resistance to impact penetration and excellent fastness to washing, can be produced by carrying out the reaction of a methylol melamine and methylol stearamide, or their respective lower alkyl ethers such as the ethyl, methyl, etc., prior to their application to the fiber and in the presence of a substantial amount of hydrogen chloride. In carrying out the process according to this invention, it is theorized that a part of the methylol stearamide reacts with a part of the methylol melamine, while the remainder of the methylol stearamide is converted to methylene distearamide and the rest of the methylol melamine is condensed further to a resinous product. The reaction is preferably carried to a point where a large part of the methylol groups have been converted to methylene bridges but where some methylol groups still remain unchanged or as ethers of the lower alcohols so that they may be converted to quaternary pyridinium compounds upon heating, for instance, with pyridine chloride. The combination with pyridine chloride gives a product which has improved stability in the aqueous dispersions, although this addition does not noticeably affect the water-repellent properties.

These water-repellent compositions are preferably applied to textile material in combination with a dispersing agent such as the stearamido-methyl-pyridinium chloride or similar quaternary ammonium type compounds which also contribute desirable properties to the water-repellent finish.

While it is recognized that methylol amides or methylol melamines give ethers when reacted with alcohols in the presence of catalytic amounts of acids such as from 0.1 to 0.01 mol, and that in the case of methylol stearamide it forms an ether with itself under mild acidic conditions, giving a product which melts at 108° C., it has now been found that, when the acid concentration is materially increased, the reaction apparently proceeds quite differently, for, in addition to water, one mol of formaldehyde is eliminated and methylene amides are formed. Under these strongly acidic conditions the reaction is apparently almost exclusively between the methylol groups of the amides and the amines, with the formation of a methylene link which appears to be more stable and gives greater water-repellency. No appreciable reaction appears to take place between the methylol amides and the alcohol used as a solvent for the reaction under the conditions employed in the process of the present invention.

The reaction of the present invention proceeds slowly in the desired direction if one mol or less of hydrogen chloride per mol of melamine is used. The practical limits of HCl concentration are from 0.5 to 4 mols of HCl per mol of methylol melamine.

The following examples are given to more fully illustrate the invention. The parts used are by weight, unless otherwise specified.

Example 1

332 parts of isopropyl alcohol containing 12 parts of anhydrous hydrogen chloride were heated to 65° C., and then 80 parts of a partially polymerized methylol melamine were added. (The melamine compound employed here was a commercial grade having a nitrogen analysis of 34%, and may be considered, therefore, as substantially a partially polymerized tetramethylol melamine.) After about half an hour at 60°–65° C., a clear solution was obtained, most of the methylol melamine being converted to the isopropyl ether. The hydrogen chloride concentration was now increased by adding 48 parts of a 25% isopropyl alcoholic solution, and then 446 parts of flaked methylol stearamide were added over the period of half an hour, while agitating the mixture and heating in a water bath of 67° C. The temperature of the reaction mixture was maintained between 60° and 70° C. for 1½ hours, the initially fluid reaction mass becoming increasingly more viscous during this period. 33 parts of pyridine were then added, followed half an hour later by a mixture of 112 parts of stearamido-methylene-pyridinium chloride, which serves as a dispersing agent and also contributes to the water-repellent finish which is obtained when the product is applied to fabrics, and 112 parts of isopropyl alcohol. On cooling, the reaction mass set up to a creamy paste, which dispersed readily in warm water. The particle size of the dispersed phase was between 1 and 3 microns.

For testing its water-repellency characteristics, the above product was applied to cotton from an aqueous dispersion containing 6% of the above creamy paste by weight, and the fabric was subjected to baking at a temperature of 175° C. for about 2 to 3 minutes. A finish was obtained which gave excellent initial repellency and which was very resistant to washing and particularly to dry cleaning. In the impact penetration and rain test, the finish also showed good resistance.

Example 2

The reaction was carried out as in Example 1, but the added stearamido-methylene-pyridinium chloride was replaced by an equal weight of the pyridine-after treated condensation product of stearic acid chloride and hexamethylenetetramine, as described in U. S. Patent 2,242,565.

The resulting final product had the same working properties as the one described in Example 1.

Example 3

190 parts of anhydrous isopropyl alcohol containing 2.5 parts of hydrogen chloride are heated to 70° C. and then 370 parts of methylol stearamide flakes are added. The reaction mass is now heated in the course of 2 to 3 hours to 68° C. During this period, part of the methylol stearamide is converted to the isopropyl ether; another portion, to the stearamido-methylene ether of methylol stearamide, a compound melting at 108° C.; some methylol stearamide remains unchanged, while a small portion changes to methylene distearamide.

A mixture of 56 parts of partially polymerized methylol melamines (trimethylol or tetramethylol melamine), 105 parts of isopropyl alcohol and 19 parts of hydrogen chloride is then added. The reaction mixture is heated for ½ to 2 hours at 68° to 72° C. to effect the reaction of the polymethylol melamine with the ethers of methylol stearamide. 50 parts of pyridine are then added; this forms first the hydrogen chloride salt, which in turn reacts with residual methylol groups of the resins and resin-methylol condensation product giving quaternary pyridinium salts. The reaction with pyridine hydrochloride is finished in ½ to 1½ hours. There are then added 180 parts of stearamido-methyl-pyridinium chloride, which serves as a dispersing agent and also contributes to the water-repellent finish which is obtained when the product is applied to fabrics.

Instead of the stearamido-methyl-pyridinium chloride, other quaternary ammonium type water-repelling agents may be used, such as octadecyl-carbamido-methylene-pyridinium chloride or methylene bis-(stearamido-methyl-pyridinium chloride). See, for instance, U. S. Patents 2,369,776, 2,386,140 and 2,386,142. In place of pyridine, gamma-picoline or other pyridine homologs may be used.

Example 4

A suspension of methylene distearamide in isopropyl alcohol was prepared by reacting 300 parts of methylol stearamide in 227 parts of isopropyl alcohol containing 8 parts of hydrogen chloride for 4 hours at 70° C. To this reaction mass were added 50 parts of isopropyl alcohol and 40 parts of a 20% isopropyl alcoholic solution of hydrogen chloride and then, at 40° C., 67.5 parts of methylol melamine (the same as in Example 1). The mixture was stirred at 40° C. for ½ hour and then 125 parts of methylol stearamide were added. The mixture was heated at 70° C. for 45 minutes, then cooled to 65° C. and neutralized with 34 parts of pyridine and held for half an hour at 65° C. A mixture of 150 parts of stearamido-methyl-pyridinium chloride and 150 parts of isopropyl alcohol was added and the mixture was cooled. The resulting pasty product exhibited excellent qualities as a water-repellency agent when applied to cotton as in Example 1.

Example 5

446 parts of methylol stearamide were added gradually at 60° C. to a solution of 80 parts of polymethylol melamine (same as in Example 1) in 184 parts of methyl alcohol containing 48 parts of hydrogen chloride. The reaction mixture gradually becomes viscous while it is being heated to 56°–60° C. After one hour of heating, the free acid was neutralized with 101 parts of pyridine and then a mixture of 220 parts of stearamido-methylene-pyridinium chloride and 150 parts of isopropyl alcohol were added. The resulting paste dispersed readily in warm water. When this dispersion was applied to a cotton fabric as in Example 1 it gave the same result as the product described in Example 1.

As illustrated in the above examples, the methylol stearamide is first partially reacted in the presence of a very small amount of the HCl to convert part of it to the methylene distearamide and ether of the methylol stearamide, and then the HCl concentration is increased and the reaction with the resin takes place. This is the preferred process for carrying out the process of the present invention. The methylol amide, however, can be first completely converted to the methylene distearamide, and in the same reaction medium the methylol melamine may be reacted with additional amounts of methylol stearamide.

A third alternative is to form the resin methylol stearamide and methylene distearamide simultaneously, as in Example 1.

In the above described processes, other water soluble primary or secondary alcohols may be used in place of isopropyl alcohol. In the case of the lower alcohols somewhat longer heating is required to complete the condensation, or a higher concentration of acid should be employed. While the preferred solvent for the process is isopropyl alcohol, a part of the alcohol may be replaced by other solvents such as ethyl acetate, methylethyl ketone, tertiary butyl alcohol, petroleum hydrocarbons of the kerosene fraction, chloroform, or carbon tetrachloride, up to such a concentration that they do not interfere with the solubilization of the methylol melamine.

The reaction temperature may be maintained at from 60° to 80° C., preferably at from 65° to 70° C., and the reaction time may vary from about thirty minutes to four hours.

The amount of melamine resin to be used may be from 4.5% of the amount of methylol stearamide up to 30%. The preferred quantity is around 20%. The methylol stearamide may be in the form of the pure product in powder form, but, more conveniently, a flaked product prepared from commercial stearamide may be used. In place of the stearic acid derivative in the above examples, the corresponding derivatives of other long-chain, saturated fatty acids having 14 to 22 carbon atoms, such as myristic, palmitic and behenic acids, may be used to give compounds having similar properties.

In place of pyridine, pyridine homologs may be employed, such as gamma-picoline, in converting the methylol or ether compounds to the quaternary pyridinium compounds, as illustrated in the above examples.

I claim:

1. In the process for producing water-repellency agents, the step which comprises heating a polymethylol melamine in an alcohol solution containing from 0.5 to 4 mols of hydrochloric acid per mol of the methylol melamine at a temperature of from 60° to 80° C. with a reactant of the class consisting of a methylol fatty acid amide, mixtures of methylol fatty acid amides, and the alkyl ethers of the methylol fatty acid amides formed with a water soluble alcohol of the class consisting of primary and secondary alcohols, the fatty acid group of the amide in each case being of a saturated fatty acid containing from 14 to 22 carbon atoms, the amount of the polymethylol melamine employed being from 4.5% to 36% by weight of the amount of methylol fatty acid amide or the alkyl ether of the methylol fatty acid amide employed.

2. In the process for producing water-repellency agents, the step which comprises heating methylol stearamide with from 4.5% to 36% by weight of a polymethylol melamine, in an alcohol solution containing from 0.5 to 4 mols of hydrochloric acid per mol of the methylol melamine at a temperature of from 60° to 80° C.

3. In the process for producing water-repellency agents, the step which comprises heating a polymethylol melamine in isopropyl alcohol containing from 0.5 to 4 mols of hydrochloric acid per mol of the methylol melamine at a temperature of from 60° to 80° C. with a mixture of a methylol fatty acid amide and the isopropyl ether of the methylol fatty acid amide, the fatty acid group of the amide in each case being of a saturated fatty acid containing from 14 to 22 carbon atoms, the amount of the polymethylol melamine employed being from 4.5% to 36% by weight of the methylol fatty acid amide and the isopropyl ether thereof employed.

4. In the process for producing water-repellency agents, the step which comprises heating methylol stearamide with from 4.5% to 36% by weight of a polymethylol melamine, in isopropyl alcohol containing from 0.5 to 4 mols of hydrochloric acid per mol of the methylol melamine at a temperature of from 60° to 80° C.

JOSEF PIKL.

REFERENCES CITED

The following references are of record in the file of this patent:

UNITED STATES PATENTS

| Number | Name | Date |
|---|---|---|
| 2,321,586 | D'Alelio | June 15, 1943 |
| 2,357,273 | Thurston | Aug. 29, 1944 |

Certificate of Correction

Patent No. 2,505,649    April 25, 1950

JOSEF PIKL

It is hereby certified that error appears in the printed specification of the above numbered patent requiring correction as follows:

Column 1, line 11, for "triazing" read *triazine*; line 37, after the word "invention" insert *is*; line 42, for "group" read *groups*; line 51, for "then" read *when*;

and that the said Letters Patent should be read as corrected above, so that the same may conform to the record of the case in the Patent Office.

Signed and sealed this 19th day of December, A. D. 1950.

[SEAL]

THOMAS F. MURPHY,
*Assistant Commissioner of Patents.*